US009381998B2

(12) United States Patent
Taylor

(10) Patent No.: US 9,381,998 B2
(45) Date of Patent: Jul. 5, 2016

(54) TACTILE CUEING APPARATUS

(75) Inventor: Adam Taylor, Ashford (GB)

(73) Assignee: BAE SYSTEMS plc, London (GB)

( * ) Notice: Subject to any disclaimer, the term of this patent is extended or adjusted under 35 U.S.C. 154(b) by 56 days.

(21) Appl. No.: 13/502,213

(22) PCT Filed: Oct. 8, 2010

(86) PCT No.: PCT/GB2010/051685
§ 371 (c)(1),
(2), (4) Date: Apr. 16, 2012

(87) PCT Pub. No.: WO2011/048399
PCT Pub. Date: Apr. 28, 2011

(65) Prior Publication Data
US 2012/0205494 A1 Aug. 16, 2012

(30) Foreign Application Priority Data

Oct. 19, 2009 (EP) .................................... 09173421
Oct. 19, 2009 (GB) .................................... 0918200.7

(51) Int. Cl.
G05B 11/01 (2006.01)
B64C 13/46 (2006.01)
B64C 13/10 (2006.01)

(52) U.S. Cl.
CPC ................. B64C 13/46 (2013.01); B64C 13/10 (2013.01)

(58) Field of Classification Search
USPC .............................. 318/628, 45, 48, 114, 136
See application file for complete search history.

(56) References Cited

U.S. PATENT DOCUMENTS 4,477,044 A   10/1984 Darcy et al.
5,310,138 A *  5/1994 Fitzgibbon ................ B64C 3/56
                                                244/49

(Continued)

FOREIGN PATENT DOCUMENTS

EP    2 052 966 A2   4/2009
EP    2 133 768 A2   12/2009
FR    2 718 102      10/1995
GB       742383      12/1955

OTHER PUBLICATIONS

International Search Report dated Feb. 9, 2011 issued in PCT/GB2010/051685.

(Continued)

Primary Examiner — Eduardo Colon Santana
Assistant Examiner — Iftekhar Mustafa
(74) Attorney, Agent, or Firm — Scully, Scott, Murphy & Presser, P.C.

(57) ABSTRACT

A tactile cueing apparatus for incorporation in an aircraft flight control system comprising a flight control surface, and a pilots inceptor (12) for moving the surface via a servo-assisted mechanical linkage (28) connecting the inceptor to the control surface, the apparatus comprising a force sensor for sensing a force applied to the inceptor by the pilot to move the control surface, an electromechanical actuator (34) configured to be installed with the mechanical linkage between the inceptor and means in the system providing said servo-assistance, and control means programmed to cause the actuator (i) to move so that the linkage moves to a position determined by said force according to a predetermined relationship, (ii) to apply to the inceptor a resisting force according to a predetermined relationship and which when the linkage has moved to its commanded position is equal and opposite to the force sensed by the force sensor.

17 Claims, 8 Drawing Sheets

(56) References Cited

U.S. PATENT DOCUMENTS

| | | | |
|---|---|---|---|
| 5,911,390 A | 6/1999 | Pohling | |
| 5,986,359 A * | 11/1999 | Enderich | H02H 7/0844 307/125 |
| 2003/0226937 A1 * | 12/2003 | Einthoven | B64C 13/503 244/236 |
| 2005/0173595 A1 * | 8/2005 | Hoh | B64C 13/04 244/223 |

OTHER PUBLICATIONS

European Search Report dated Mar. 12, 2010 issued in EP 09 17 3421.

UK Search Report dated Feb. 4, 2010 issued in GB0918200.7.

International Preliminary Report on Patentability and Written Opinion, dated May 3, 2012 from related International Application No. PCT/GB2010/051685.

\* cited by examiner

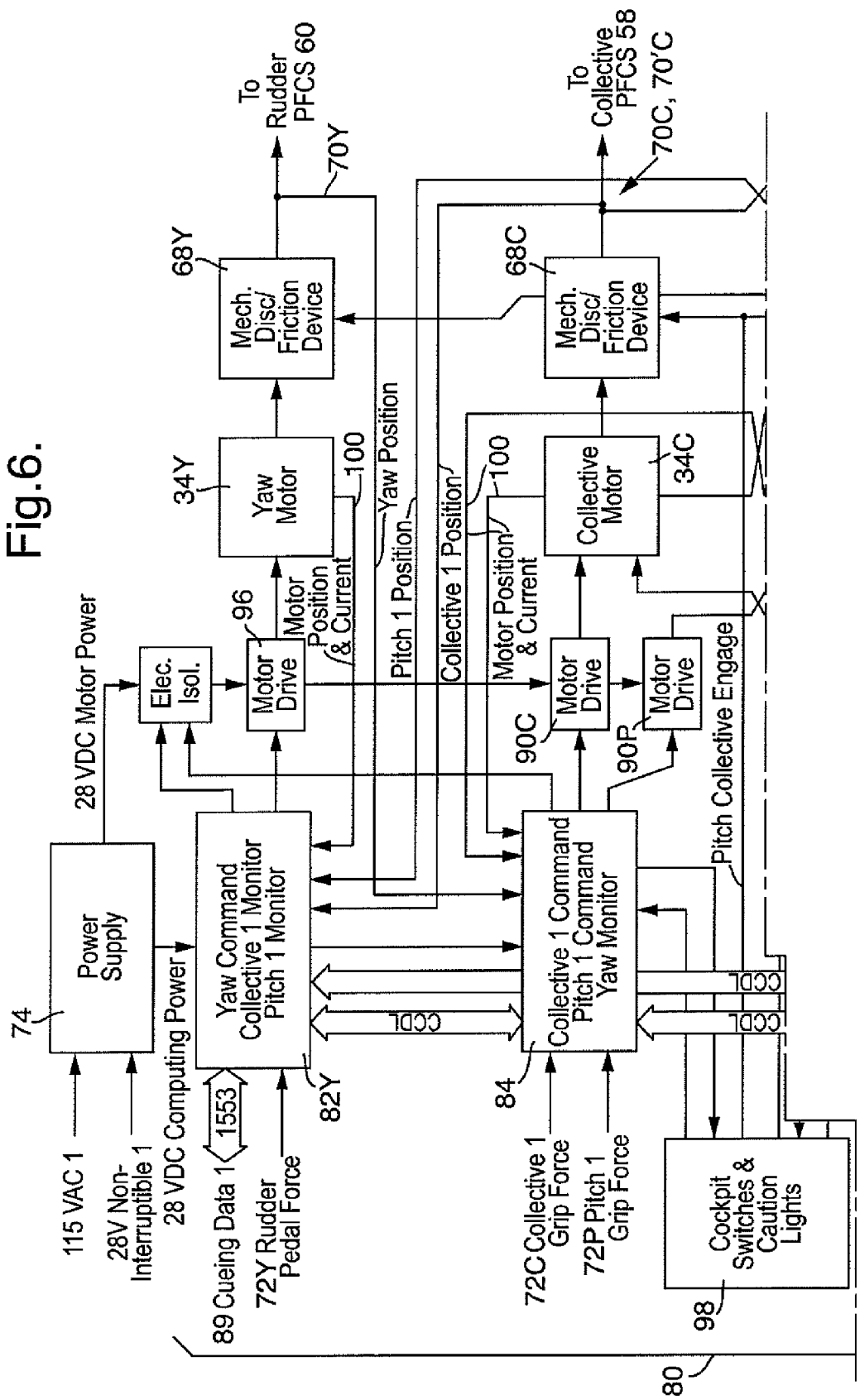

TACTILE CUEING APPARATUS

This invention relates to a tactile cueing apparatus for an aircraft. Tactile cueing is the generation of artificial "feel" in a pilot's control inceptor of the aircraft which otherwise would be absent or reduced because of the presence of power assistance between the inceptor and the aircraft flight control surface or other controlled element which it operates. The invention may also be used to generate artificial feel in unassisted flight control systems in which aerodynamic loads on the flight control surfaces do not themselves generate sufficient tactile feedback to the pilot (e.g. in very light helicopters and fixed wing aircraft), and in other aircraft mechanical controls which may require tactile feedback, for example a twist grip engine throttle control in a helicopter.

State-of-the-art aircraft have fly-by-wire systems in which there is no direct mechanical connection between the pilot's inceptor and the flight control surfaces. Tactile feedback to the pilot from the control surfaces either is lacking or in the most recent aircraft is synthesised by the aircraft's computerised flight control system. There are however many more mature aircraft which have mechanical linkage (e.g. rods, cables, gearing, bell-cranks) between the control inceptors and the flight control surfaces. In an aircraft of any size or performance, the control forces required at the inceptor can become greater than the pilot can comfortably apply. Therefore such aircraft have servo-assistance, generally hydraulic rams or motors. The inclusion of such servo-assistance however deprives the pilot of most of the "feel" of the controls, and some illusion of feel has to be provided by mechanical devices such as springs and dampers which resist movement of the inceptor from its centre ("hands-off") position.

The present invention aims in its preferred embodiments to provide an alternative to such mechanical devices, which will enable the tactile cues available to the pilot of such mature aircraft to be upgraded without the expense of retrofitting full fly-by-wire systems to the aircraft.

According to the invention, there is provided a tactile cueing apparatus for incorporation in an aircraft control system comprising a controlled element, and an operator's inceptor for moving the controlled element via a mechanical linkage connecting the inceptor to the controlled element, the apparatus comprising an input sensor for sensing a control input to the inceptor by the operator to move the controlled element, a controllable actuator (preferably an electromechanical actuator) configured to be installed with the mechanical linkage between the inceptor and the controlled element, and control means programmed to cause the actuator
  (i) to move so as to cause or permit the linkage to move to a position determined by the control input according to a predetermined relationship.
  (ii) to apply to the inceptor a resisting force determined by the control input according to a predetermined relationship.

The input sensor may sense a force applied to the inceptor by the operator. The resisting force then may be equal and opposite to the force applied to the inceptor by the operator when the linkage has moved to a position determined by the operator's input force according to the predetermined relationship.

It will be appreciated that the term "force" is used figuratively in this specification, so as to include a torque or moment as well as a linear force.

The predetermined relationship may comprise a non-linear relationship between the resisting force and the linkage position.

The predetermined relationship may comprise at least one range of force values within which a change in the force produces no movement of the mechanical linkage.

The control means may be programmed to change the predetermined relationship with a change in the aircraft's flight conditions.

The actuator may be a rotary actuator.

The apparatus may comprise a clutch or other disengaging means operable in the event of failure of the apparatus for disengaging the apparatus from the mechanical linkage.

The disengaging means when operative may apply a passive resisting force to the inceptor against movement thereof.

The invention also provides a tactile cueing system comprising a plurality of the tactile cueing apparatuses set forth above, each configured to be installed with a said mechanical linkage to a different control element of the aircraft, a said control means of a first said apparatus being arranged to monitor the operation of a said control means of a second said apparatus.

There may be feedback means for supplying a feedback signal indicative of the linkage position controlled by the second said apparatus to the control means of the first said apparatus and thence to the control means of the second said apparatus.

A said actuator may be arranged to be controlled in parallel by two said control means.

The invention also provides an aircraft comprising tactile cueing apparatus or a tactile cueing system as set forth above.

The invention will now be described merely by way of example with reference to the accompanying drawings wherein FIGS. 1A and 1B show a prior-art aircraft suitable for retrofitting with tactile cueing apparatus according to the invention, FIG. 1B being a plan view of part of the aircraft cockpit;

Figure 1A:
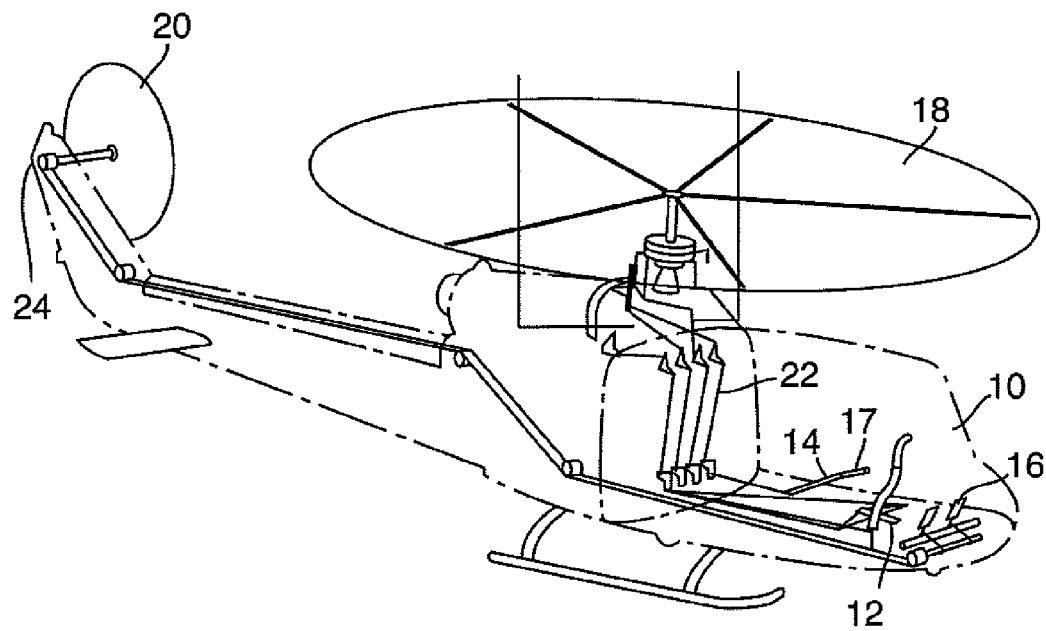
Figure 1B:
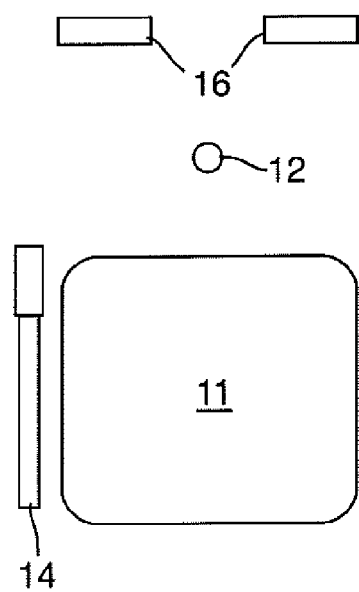

Referring to FIG. 1, an aircraft (here a helicopter) has a cockpit 10 provided with a pilot's seat II around which are arranged flight control inceptors namely a cyclic pitch control stick 12 moveable about two axes to control pitch and roll, a collective pitch lever 14 to control rotor thrust and thus the aircraft's height and speed, and rudder pedals 16 to control yaw. The collective pitch lever also has a twist-grip throttle control 17.

The flight control inceptors 12, 14, 16 are connected to the main and tail rotors 18, 20 of the helicopter by mechanical linkage assisted by hydraulic rams. The rotors and their variable-pitch blades constitute the principal flight control surfaces of the helicopter. A degree of "feel" is provided by springs and dampers acting on the linkage near to the relevant inceptor.

The linkages pass from the inceptors through a compartment 22 to the rear of the cockpit where the feel springs and dampers are located and thence to the hydraulic rams (not shown). The linkages then pass to the main rotor controls and, via a tunnel at the top of the tail boom, to the tail rotor pitch controls 24.

Figure 2:
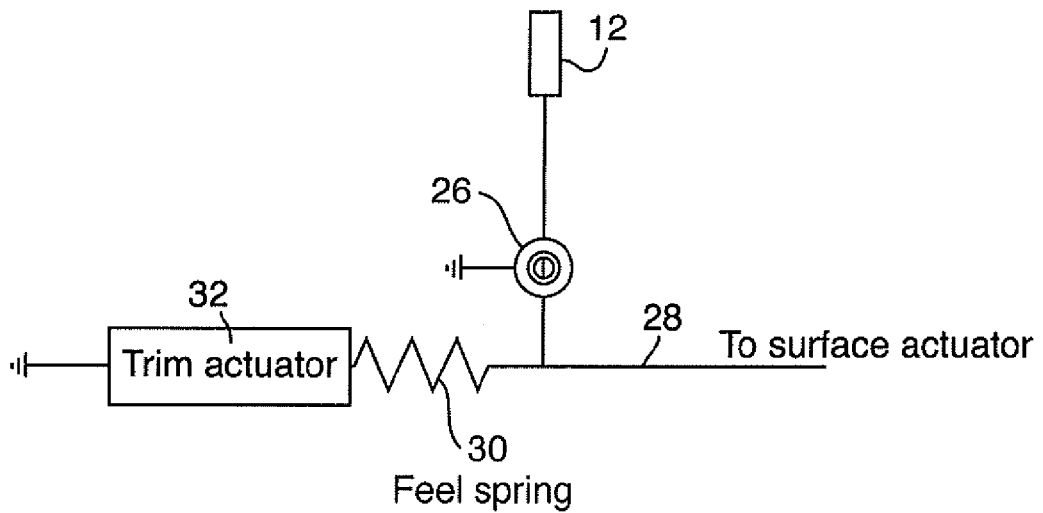
FIG. 2 shows part of a prior art flight control system.

The linkage adjacent to one of the inceptors (e.g. that relating to the pitch axis controlled by the cyclic pitch inceptor (stick) 12 is shown diagrammatically in FIG. 2. The inceptor 12 is connected via a bell crank centred on a fixed pivot 26 to the upstream end 28 of the mechanical linkage to the cyclic pitch swashplate 29 at the rotor head. A feel spring 30 is connected at one end to the inceptor 12 and at its other end to fixed aircraft structure via a trim adjustor 32 which moves the effective point of connection of the spring to the fixed structure. The centre or "hands-off" position of the inceptor 12 thus can be adjusted. A viscous damper is provided in parallel with the spring 30 but for simplicity is not shown in FIG. 2.

Figure 3:
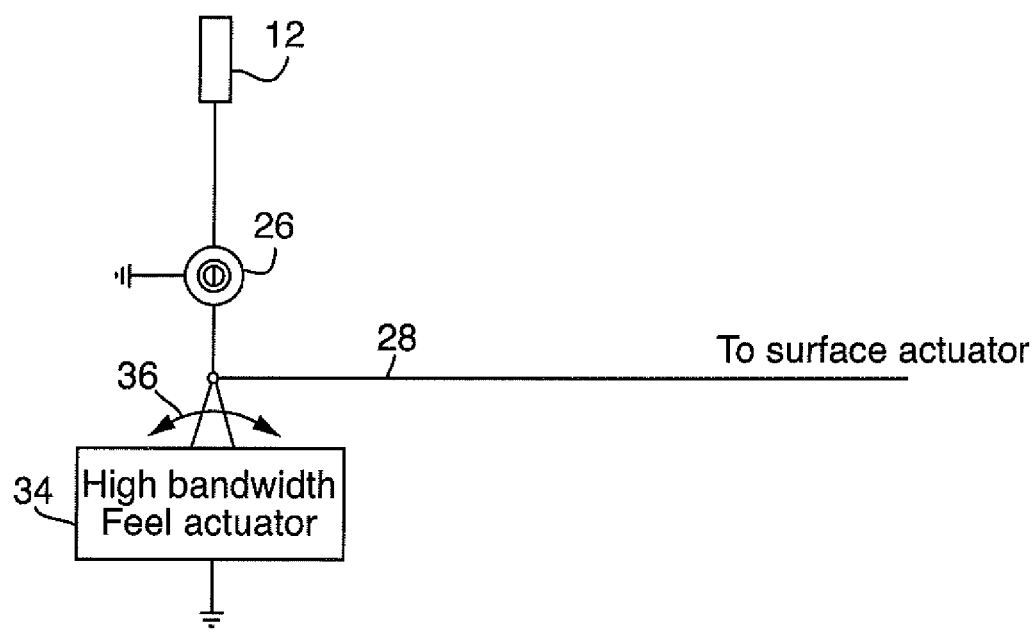
FIG. 3 shows the corresponding part of a system incorporating apparatus according to the invention.

In the invention, as shown in FIG. 3, the mechanical feel-producing components and the trim adjustor are replaced by an electromechanical or the controllable actuator, here a high-bandwidth electronically controlled servomotor 34, capable of responding to pilot input at a rate of several Hz. The actuator produces a rotary output through a few tens of degrees which is communicated via a crank 36 to the mechanical linkage. All the mechanical linkages between the inceptor and the control surfaces remain undisturbed, and so the retrofit can be accomplished without major redesign or requalification of the aircraft.

Figure 4:
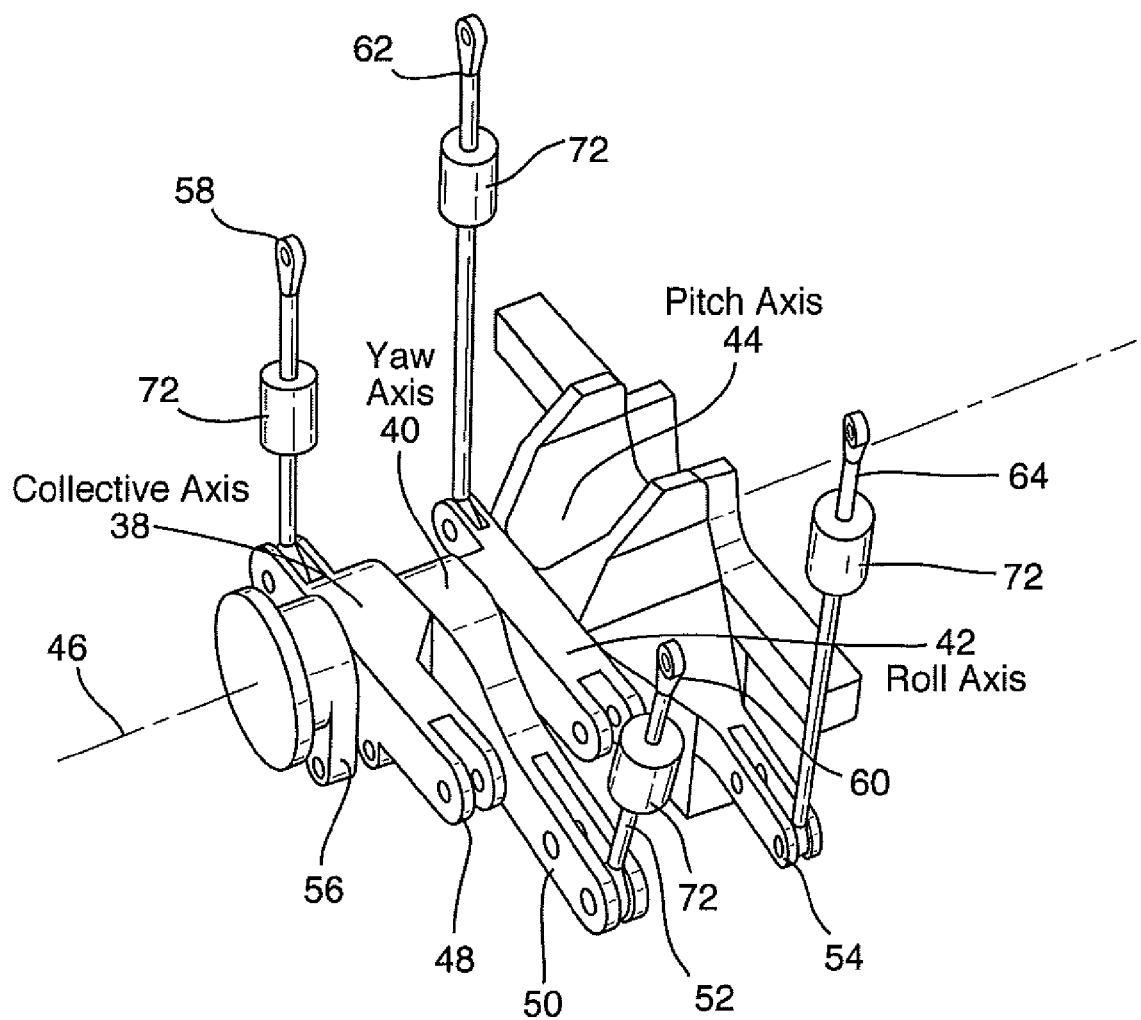
FIGS. 4 and 5 show the apparatus of FIG. 3 in more detail.
Figure 5:
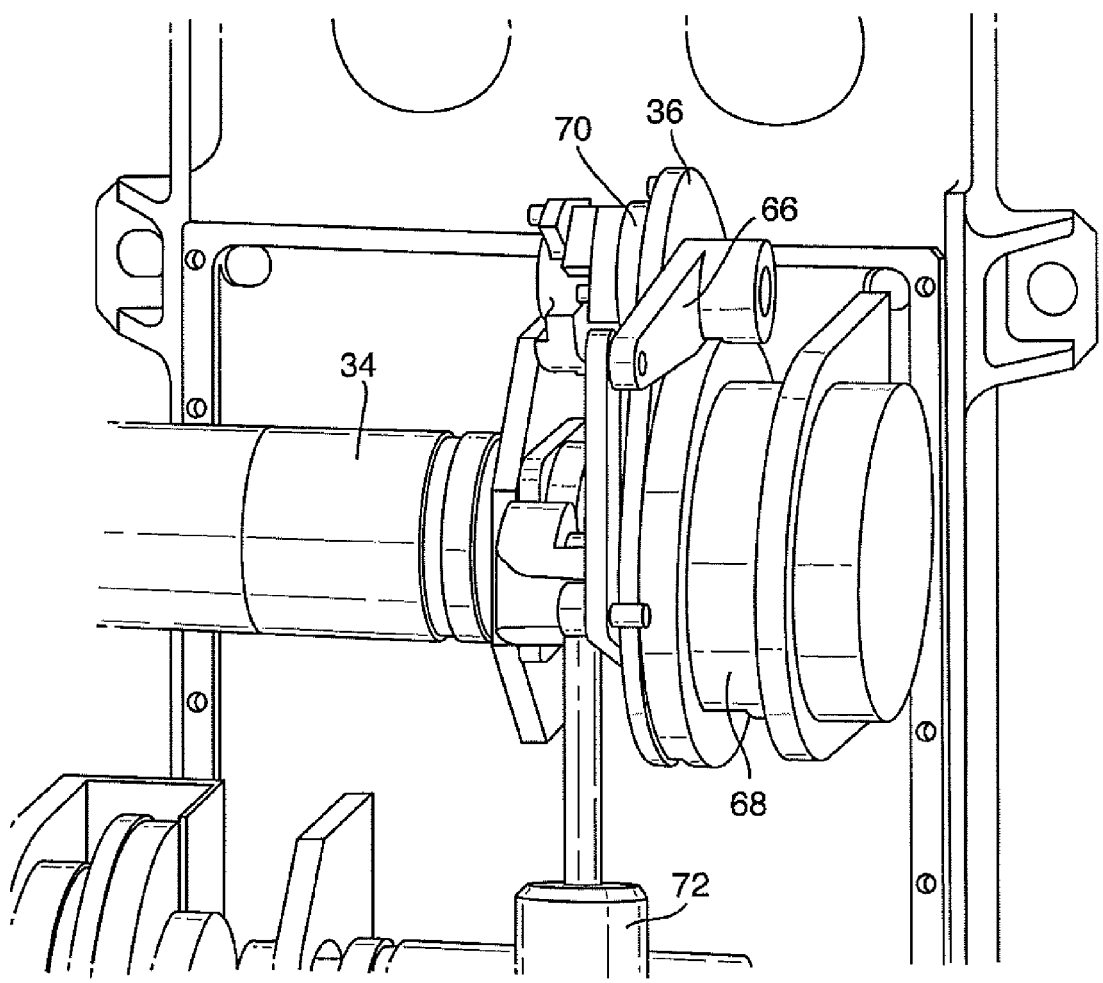

FIGS. 4 and 5 show a prototype installation. The helicopter has an assembly of bell cranks 38, 40, 42, 44 mounted on a common pivot axis 46 in the compartment 22 behind the cockpit. These respectively transmit from the pilot's inceptors to collective pitch, yaw roll and cyclic pitch commands via output arms 48, 50, 52, 54 and the mechanical linkages to the flight control surfaces. Only the input arm connection 56 to the pilot's collective pitch inceptor is visible in FIG. 4, the other input arms being hidden beneath the bell cranks.

Compared to the existing aircraft installation, the prototype differs in having an additional connection on each bell crank to a respective link 58, 60, 62, 64 which is in turn connected to a respective actuator 34 via an additional articulation 66 (FIG. 5, not shown in FIG. 3) to permit true linear motion of the link 58-64 (desirable because the links include linear displacement sensors as described hereinafter). The connection between each actuator 34 and its respective linkage 58-64, 66 is via an electromagnetic toothed clutch 68 which when engaged provides a positive drive from the actuator to the linkage. When disengaged, e.g. in the event that the actuator 34 fails, the clutch provides a fixed level of frictional resistance in that there is some residual "feel" still present at the inceptor 12. Other means of disconnecting a failed (e.g. jammed) actuator from the control linkage may be employed, for example a shear pin, but alternative means of providing fixed frictional resistance then would be needed.

Each actuator 34 comprises a dual or single wound servomotor (depending on whether it is to be used in a duplex or single control path as discussed below), a reduction gearbox, and duplex or simplex resolvers to sense the position of the motor shaft. When the motor is dual-wound, each winding is sized to provide 100% of the required motor torque capability, and the windings have low mutual induction, to minimise the effect of a failed winding on the other winding.

A position sensor 70 accurately measures the angular position of the output shaft of the actuator 34, downstream of its associated clutch 68. The sensor is of the rotary variable differential transformer type, which provides a variable AC output which is linearly proportional to the angular displacement of the shaft.

Each of the links 58-64 incorporates a force sensor 72 which measures the force applied by the pilot to the respective inceptor 12, each force sensor 72 comprises a displacement sensor of the linear variable differential transformer type in combination with a high-stiffness spring, the characteristic of which is accurately known. The displacement measured by the displacement sensor thus bears a direct relationship to the force applied across the force sensor 72, and is utilised as such in the control of its associated actuator 34, as described hereafter.

Figure 6:
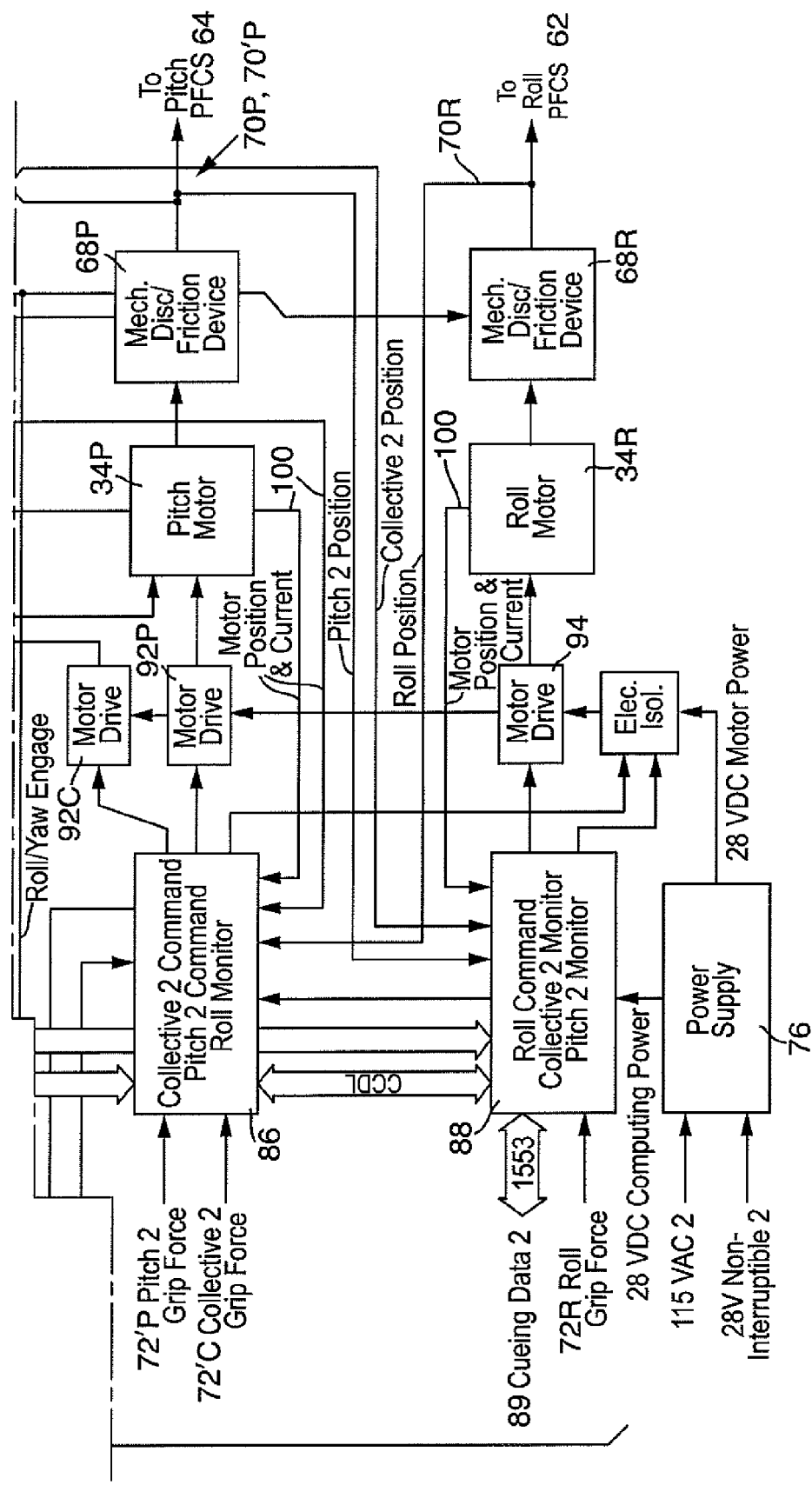
FIG. 6 shows the architecture of the apparatus.

The architecture of the tactile cueing apparatus is shown in FIG. 6, parts already described having the same reference numerals, with the suffix Y (yaw) C (collective pitch) P (cyclic pitch) and R (roll) where necessary for further identification.

The apparatus provides a total of 4 mechanical outputs:
Collective pitch to link 58 (FIG. 4)
Pitch Cyclic to link 64
Roll cyclic to link 62
Rudder pedal to link 60

The collective and cyclic axes are fail-operational after electrical failures. For this reason, these control paths are duplex and the following components are duplicated in these axes:
Motor coils
Motor electronic drive
Motor command processing
Motor position resolver
Motor current sensors
Inceptor force sensor
Inceptor position sensor In addition the two halves of these axes are powered from separate power supplies 74, 76. Each power supply converts power from the aircraft 115V AC bus to produce two 28V DC outputs. One of these is a high power output dedicated to powering the servomotors. The other is a lower power output and after conditioning is used by a tactile cueing controller 80 described below. This supply is backed-up by a 28V uninterruptable power supply 78 from a battery (not shown).

The high-power supply to the motors 34 is fed to PWM inverter motor drives 90-96 that generate sinusoidal voltages to the motor coils. The controller 80 monitors the supply to the inverters to compensate for variations in the input voltage, and closed loop control of the drive current to the servomotor 34 further increases the tolerance of degradation in the supply voltage.

The controller 80 has four primary computing elements 82, 84, 86, 88, which receive from the aircraft's flight computer program data 89 defining predetermined desired relationships between inceptor force and flight control surface position, for cyclic pitch, collective pitch cyclic roll and yaw. The purpose of each primary computing element is to generate commands to its motor 34 based on the sensed inceptor force and position from its respective force and position sensors 72, 70 or their duplicates 72' and 70' if the controls are duplex.

The collective pitch and the cyclic pitch controls are duplex, and thus their respective motors 34C and 34P have two windings, powered by respective motor drives 90C, 92C and 90P, 92P which are commanded in parallel by primary computing elements 84 and 86. The roll and yaw controls are not duplex, and their servomotors 34R and 34Y have only single windings, powered by motor drives 94 and 96. These drives are commanded by primary computing elements 88 and 82.

The primary computing elements also monitor the response of the system to these commands and electrically isolate their motor drives in the event a fault is detected. There are other processors in the controller dedicated to lower-level functions such as motor commutation and inner loop control of the motor current. Fault in these low-level processors are detected by in-line monitoring of the system response by the primary computing elements.

Figure 7:
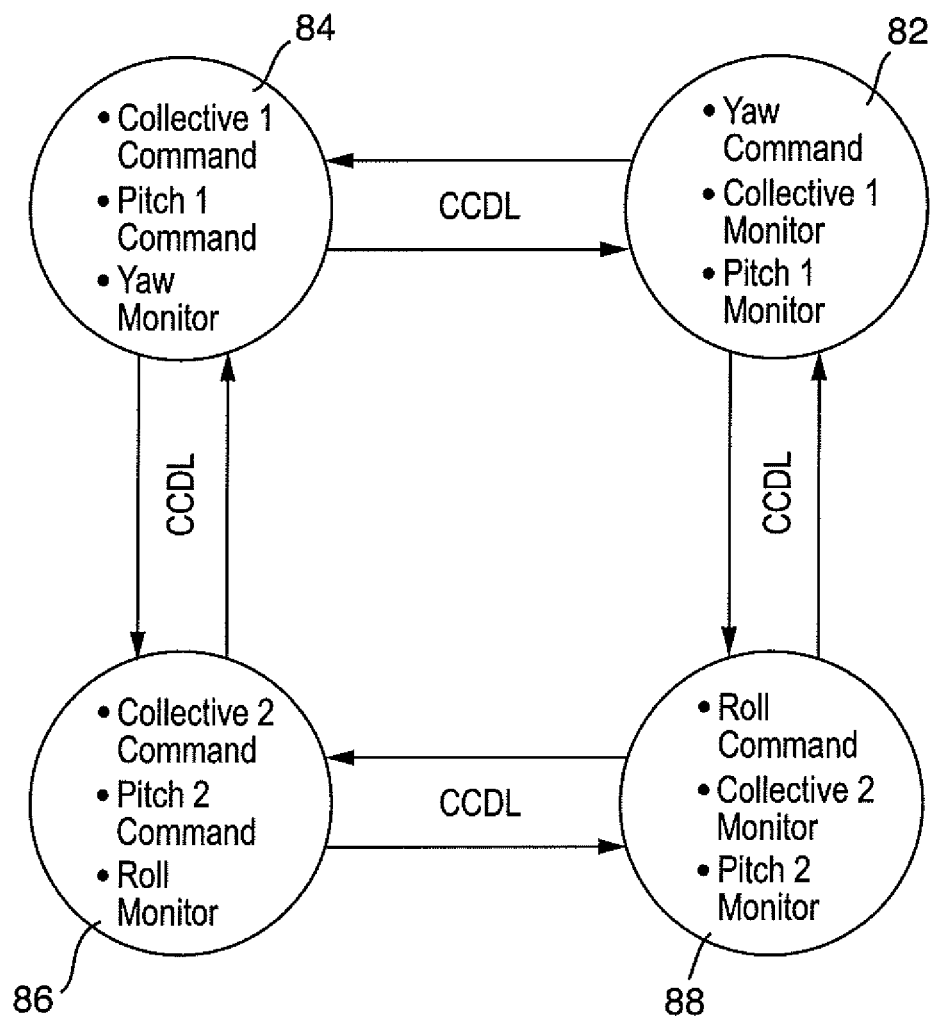
FIG. 7 shows some of the data links within the apparatus.

Faults in the primary computing elements 82, 84, 86, 88 are detected by replicating the function of each element in another of the elements and comparing the results. For this purpose the primary computing elements are arranged in command/monitor pairs and connected by point-to-point serial cross-channel data links (CCDL) as shown in FIG. 6. Specifically, the command/monitor pairs are as shown in FIG. 7, from which it can be seen that they are as follows:

| Function | Command | Monitor |
| --- | --- | --- |
| Yaw | 82 | 84 |
| Collective Pitch 1 | 84 | 82 |
| Collective pitch 2 | 86 | 88 |
| Cyclic pitch 1 | 84 | 82 |
| Cyclic pitch 2 | 86 | 88 |
| Roll | 88 | 86 |

The command and monitor pair exchange and compare their outputs. In the event of a disagreement between the outputs of a pair, either member of the pair can isolate the appropriate motor 34 by disengaging the relevant clutch 68. Once a motor has been isolated it is held latched in the isolated state and neither the command nor monitor channel can re-engage the motor without pilot consent. Consent is given by the pilot attempting to re-engage the tactile cueing apparatus from a control panel 98 in the cockpit. It is expected that the pilot will only attempt to reset the cueing system in a benign flight condition. The command and monitor pair will only accept the reset if the fault condition is no longer present.

In-line monitoring of the system response is performed by both the command and monitor channels. The signals from sensors 70, 72 used for in-line monitoring are conditioned and converted in the command channel before being sent to the monitor channel across the CCDL. In the case of the inceptor force sensors 72, self-checking of the health of the signal is possible through sum and difference checking of the output of the sensor. Similarly the linkage position signal from sensor 70 has redundancy in the form of sine and cosine outputs. Although the input sensor data handling is protected to an extent from interference or corruption by the command primary computing element, there is a remote possibility that a single fault could corrupt both the command and sensor input signals. For this reason the force and position sensor data is routed via the monitor channel.

The primary means of in-line monitoring is to monitor the response of the system to motor commands. This is performed by comparing the position and force signals 70, 72 with those predicted by the internal program 89. The response of the motor drive current loop is also monitored by comparing the sensed current with the demand via a feedback loop 100. Failures of the inceptor force sensor 72 are detected by monitoring the force balance between the motor torque, inceptor force and passive return springs (if fitted) Jam failures of the motor or gearbox are detected in a similar manner except that such failures are characterised by the absence of inceptor motion.

Either or both the lateral (cyclic pitch and yaw) and longitudinal axes (collective pitch and roll) can be put into passive mode, in which the motor 34 and its gearbox are mechanically isolated by disengaging the appropriate clutch 68.

In operation, when the pilot applies a force to the inceptor with the intention of moving the control linkage, the force is sensed by force sensor 72 and is communicated via feedback loop 100 to the relevant primary computing element 82-88, which then commands the motor 34 to resist it by generating sufficient torque to apply an opposite force to the inceptor linkage. At the same time the primary computing element commands the motor 34 to rotate whilst maintaining the resisting force so as to permit the hydraulic ram 24 to move the control linkage until the position of the control surface (as fed back to the primary computing element by the position sensor 70) matches the position determined by the force-position relationship defined in the program 89 as corresponding to the pilot's input force. During this linkage movement, the magnitude of the resisting force is determined according to the force-position relationship by the instantaneous linkage position. When the linkage reaches the final position commanded by the pilots input force, the resisting force is equal and opposite to the input force and no further movement of the inceptor or the control linkage occurs. Thus the pilot is provided with a tactile cue or "feel" in the response of the inceptor to his control input, and the control surface has moved to a position appropriate to his control input.

Figure 8:
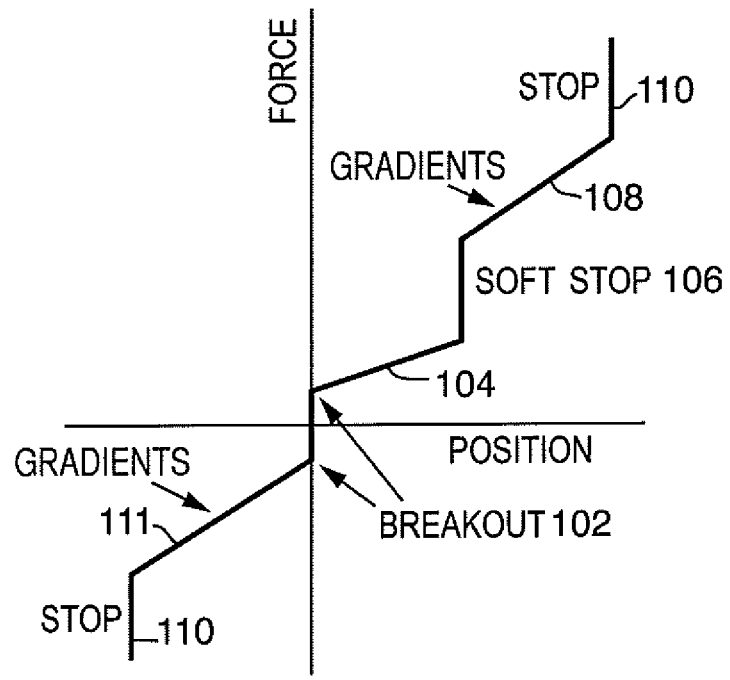
FIGS. 8 and 9 illustrate relationships between inceptor force and control surface position which can be provided by apparatus according to the invention.

FIG. 8 illustrates a typical desired relationship between inceptor force and control surface position for a "return to centre" function, such as is required for cyclic pitch. The controller 80 compares the feedback from the inceptor force sensors 72 and the control linkage position sensors 70 with the values provided by the relationship. The central or "hands-off" position of the inceptor is at the origin of the axes, and an initial "breakout" force 102 is required to be applied by the pilot to the inceptor and sensed by the force sensor 72 before the servomotor 34 will be commanded to permit the flight control surface linkages to move. There then follows for an increasing force application in one sense by the pilot (e.g. pitch-down) a force-position relationship of relatively moderate gradient 104 in which substantial movements of the control surfaces can be commanded by relatively small changes in the force input to the inceptor. This represents the range of control movements required for normal flight conditions. At 106 there is a "soft stop", at which a significant step-change in force is needed to command any further control surface movement, and beyond this a further region 108 where the gradient is steeper and so the additional pilot input force required for a given control surface movement is greater. This region defines the force-position relationship towards the limits of the available control surface movement, the maximum amount of which is determined by the stop 110 at which the controller permits no further movement of the actuator 34.

The relationship for an inceptor force in the opposite sense (e.g. pitch-up) is similar except that there is no soft stop, and only a single gradient 111.

Figure 9:
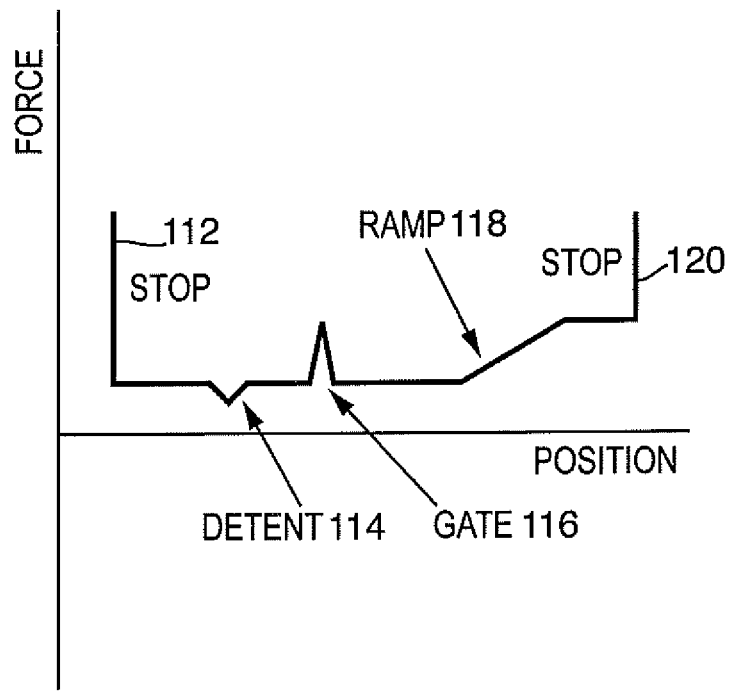

FIG. 9 illustrates a desired relationship for a control function which is not "return to centre". An example is collective pitch or rotor thrust, with which control of the aircraft engine often is integrated. Portion 112 represents a stop or engine-off position, from which the inceptor can be moved in response to minimal force to a detent 114 which provides an engine start and ground idle position. Further movement of the inceptor past a gate 116 requires a significant transient force input from the pilot. Thereafter a ramp portion 118 provides steadily increasing thrust until a full throttle position 120 is reached. FIGS. 8 and 9 are of course illustrative only, but they show that the force-position relationship can be made non-linear, with soft-stops, detents and regions of different gradient. Indeed the gradients may themselves change with control surface position. The relationships, being input from the aircraft's flight central computer, can be changed with the aircraft's flight condition. For example they may be modified according to the aircraft's take-off weight, or even adjusted in flight as the weight of the aircraft changes e.g. as fuel is consumed or (in the case of in-flight refuelling, dispensed or received), or a payload is air-dropped.

One instance of adjustment in flight is in trimming the flight controls, under the control of the pilot. Adjusting the force-position relationship of FIG. 8 for example so as to move it bodily to the left or right along the position axis will adjust the centre or "hands-off" position of the pilot's inceptor.

Other features which may be provided within the system are warning cues such as a stick-shaker, if the pilot is commanding flight control surface movements which would take the aircraft outside its flight envelope, or of course if airspeed and attitude sensors indicate that such an excursion already is occurring. The stick-shaker input would be provided for the aircraft's flight control computer directly to the primary computing elements 82-88.

Although described in the context of a single-rotor helicopter, the invention of course is applicable to dual-rotor helicopters, and to fixed-wing aircraft, the primary flight control surfaces in the latter case then being the ailerons, elevators and rudder.

The invention also includes any novel feature or combination of features whether or not appearing in the claims. The appended abstract as filed is repeated here as part of the specification.

A tactile cueing apparatus for incorporation in an aircraft flight control system comprising a flight control surface, and a pilot's inceptor for moving the surface via a servo-assisted mechanical linkage connecting the inceptor to the control surface, the apparatus comprising a force sensor for sensing a force applied to the inceptor by the pilot to move the control surface, an electromechanical actuator configured to be installed with the mechanical linkage between the inceptor and means in the system providing said servo-assistance, and control means programmed to cause the actuator (i) to move so that the linkage moves to a position determined by said force according to a predetermined relationship.

(ii) to apply to the inceptor a resisting force according to a predetermined relationship and which when the linkage has moved to its commanded position is equal and opposite to the force sensed by the force sensor.

The invention claimed is:

1. A tactile cueing apparatus to augment an aircraft control system, the aircraft control system comprising a controlled element and an operator's inceptor for moving the controlled element via a mechanical linkage connected to the inceptor and linked to the controlled element, wherein the tactile cueing apparatus comprises:
a force sensor for sensing a control input to the inceptor by the operator to move the mechanical linkage, the force sensor providing an output;
a controllable actuator arranged to be configured to move the mechanical linkage;
a position sensor for sensing a position of the mechanical linkage, the position sensor providing an output; and
control means programmed to cause the actuator, based upon a predetermined force-position relationship that defines a required effect upon the position of the mechanical linkage for a given combination of a force as sensed by the force sensor and a generated resisting force, to:
(i) move the mechanical linkage to a position determined by the output of the force sensor and the force-position relationship, wherein the actuator moves the mechanical linkage when the output of the position sensor does not conform to a given position indicated by the force-position relationship at a given input force applied to the inceptor; and
(ii) apply to the inceptor the generated resisting force determined by the output of the position sensor and the force-position relationship wherein the generated resisting force is equal and opposite to the force applied to the inceptor by the operator when the mechanical linkage has moved to a position determined by the force sensor output according to the force-position relationship.

2. The apparatus of claim 1 wherein the force-position relationship comprises a non-linear relationship between the generated resisting force and the inceptor position.

3. The apparatus of claim 2, wherein the force-position relationship comprises at least one range of force values in which a change in the force produces no movement of the mechanical linkage.

4. The apparatus of claim 1 wherein the control means is programmed to change the force-position relationship with a change in the aircraft's flight conditions.

5. The apparatus of claim 1 wherein the actuator is a rotary actuator.

6. The apparatus of claim 1 further comprising a clutch or other disengaging means operable in the event of failure of the apparatus for disengaging the apparatus from the mechanical linkage.

7. The apparatus of claim 6 in which the disengaging means when operative applies a passive resisting force to the inceptor against movement thereof.

8. The apparatus of claim 1 wherein the controlled element is a flight control surface.

9. An aircraft provided with the tactile cueing apparatus of claim 1.

10. The apparatus of claim 1, wherein the control means is further programmed to cause the actuator to permit the mechanical linkage to move to a position determined by the control input according to the force-position relationship.

11. The apparatus of claim 1, wherein the apparatus is configured to be retrofit into the aircraft such that the mechanical linkage between the inceptor and the controlled element remains undisturbed.

12. A tactile cueing system comprising a plurality of tactile cueing apparatus to augment an aircraft control system, the aircraft control system comprising a plurality of controlled elements and an operator's inceptor for moving each controlled element via a respective mechanical linkage connected to the inceptor and linked to the respective controlled element, wherein each of the plurality of tactile cueing apparatus comprises:
a force sensor for sensing a control input to the inceptor by the operator to move the respective mechanical linkage, the force sensor providing an output;
a controllable actuator arranged to be configured to move the respective mechanical linkage;
a position sensor for sensing a position of the respective mechanical linkage, the position sensor providing an output; and
control means programmed to cause the actuator, based upon a respective predetermined force-position relationship that defines a required effect upon the position of the respective mechanical linkage for a given combination of a force as sensed by the force sensor and a generated resisting force, to:
(i) move the respective mechanical linkage to a position determined by the output of the force sensor and the respective force-position relationship, wherein the actuator moves the respective mechanical linkage when the output of the position sensor does not conform to a given position indicated by the respective force-position relationship at a given input force applied to the inceptor; and (ii) apply to the inceptor the generated resisting force determined by the output of the position sensor and the respective force-position relationship; wherein the generated resisting force is equal and opposite to the force applied to the inceptor by the operator when the respective mechanical linkage has moved to a position determined by the force sensor output according to the respective force-position relationship;

each tactile cueing apparatus configured to be installed to move the respective mechanical linkage, a said control means of a first said apparatus being arranged to monitor the operation of a said control means of a second said apparatus.

13. The system of claim 12 further comprising feedback means for supplying a feedback signal indicative of a respective mechanical linkage position controlled by the second said apparatus to the control means of the first said apparatus and thence to the control means of the second said apparatus.

14. The system of claim 12 wherein a said actuator is arranged to be controlled in parallel by two said control means.

15. An aircraft provided with the tactile cueing system of claim 12.

16. The system of claim 12, wherein each control means is further programmed to cause the respective actuator to permit the respective mechanical linkage to move to a position determined by the control input according to the respective force-position relationship.

17. The system of claim 12, wherein the system is configured to be retrofit into the aircraft such that each respective mechanical linkage between the inceptor and each respective controlled element remains undisturbed.

* * * * *